US008769025B2

(12) United States Patent
Cui et al.

(10) Patent No.: US 8,769,025 B2
(45) Date of Patent: Jul. 1, 2014

(54) CLUSTER SERVER OF AN INSTANT MESSAGING SYSTEM AND MESSAGING METHOD BETWEEN CLUSTERS

(75) Inventors: Zhenfeng Cui, Shenzhen (CN); Jianfeng Lu, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 198 days.

(21) Appl. No.: 13/257,908

(22) PCT Filed: Dec. 24, 2009

(86) PCT No.: PCT/CN2009/075954
§ 371 (c)(1),
(2), (4) Date: Feb. 1, 2012

(87) PCT Pub. No.: WO2011/015018
PCT Pub. Date: Feb. 10, 2011

(65) Prior Publication Data
US 2012/0136946 A1    May 31, 2012

(30) Foreign Application Priority Data

Aug. 3, 2009  (CN) .......................... 2009 1 0090237

(51) Int. Cl.
*G06F 15/16* (2006.01)
*H04L 29/08* (2006.01)
*H04L 12/58* (2006.01)

(52) U.S. Cl.
CPC .............. *H04L 51/043* (2013.01); *H04L 67/24* (2013.01); *H04L 67/1002* (2013.01)
USPC ............................ 709/206; 709/223; 709/250

(58) Field of Classification Search
USPC ......... 709/201, 202, 204, 205, 207, 217, 219, 709/223, 224
See application file for complete search history.

(56) References Cited

U.S. PATENT DOCUMENTS

| 6,564,261 | B1 | 5/2003 | Gudjonsson et al. |
| 7,801,954 | B2 * | 9/2010 | Cadiz et al. ................... 709/204 |

(Continued)

FOREIGN PATENT DOCUMENTS

| CN | 1713621 A | 12/2005 |
| CN | 101287168 A | 10/2008 |
| RU | 2257014 C2 | 7/2005 |
| RU | 2005124472 A | 2/2007 |
| RU | 2300140 C2 | 5/2007 |

OTHER PUBLICATIONS

Supplementary European Search Report in European application No. 09847996.7, mailed on May 21, 2013.

(Continued)

*Primary Examiner* — Viet Vu
(74) *Attorney, Agent, or Firm* — Oppedahl Patent Law Firm LLC

(57) ABSTRACT

This disclosure discloses a cluster server and a messaging method between clusters in an instant messaging system, wherein in the cluster server, a storage unit is configured to store the first subscription information that a client user of the inner-cluster subscribes the presence state of a client user of an external cluster and the second subscription information that a client user of the external cluster subscribes the presence state of a client user of the inner-cluster; an information classification unit is configured to determine whether the communication message transmitted between the client user of the inner-cluster and the client user of the external cluster is a state-presence related message; and an information transmission unit is configured to transmit the communication messages according to the first and second subscription information when the communication message is a state-presence related message. Through the cluster server and method of this disclosure, by classifying the messages between the clusters, the objectives of effectively using the network bandwidths between the clusters and improving the messaging efficiency and the bearing capacity of the whole instant messaging system are fulfilled.

10 Claims, 7 Drawing Sheets

(56) References Cited

U.S. PATENT DOCUMENTS

| | | | |
|---|---|---|---|
| 8,332,516 B2* | 12/2012 | Ben-Ezra et al. | 709/226 |
| 8,487,770 B2* | 7/2013 | Boyer et al. | 340/573.1 |
| 2005/0182816 A1 | 8/2005 | Lin et al. | |
| 2006/0190600 A1* | 8/2006 | Blohm et al. | 709/225 |
| 2008/0288649 A1* | 11/2008 | Burckart et al. | 709/230 |
| 2009/0049135 A1* | 2/2009 | O'Sullivan et al. | 709/206 |
| 2009/0143086 A1 | 6/2009 | Jeong | |

OTHER PUBLICATIONS

Day Lotus J Rosenberg Dynamicsoft H Sugano Fujitsu M: "A Model for Presence and Instant Messaging" Feb. 1, 2000.

International Search Report on international application No. PCT/CN2009/075954, mailed on May 13, 2010.

English Translation of the Written Opinion of the International Search Authority in international application No. PCT/CN2009/075954, mailed on May 13, 2010.

* cited by examiner

CLUSTER SERVER OF AN INSTANT MESSAGING SYSTEM AND MESSAGING METHOD BETWEEN CLUSTERS

TECHNICAL FIELD

This disclosure relates to the field of an internet technology, in particular to a cluster server of an instant messaging system and a messaging method between clusters.

BACKGROUND

With the development of the network technology, the instant messaging system, which makes the contacts and communications among people more and more convenient, is gradually recognized and accepted by users; and as an instant contact way among people through the internet, the instant messaging has the characteristics of strong interactivity, low cost and the like so as to be widely popularized in a short time, wherein the instant messaging systems widely used by people include QQ, MSN and the like.

With the rapid increase of users in the instant messaging system, there are more and more system state broadcasting messages and instant messages, a system server needs to process more data, and a server with one database cannot meet the messaging requirements of a large amount of data and tasks, therefore, a cluster system with multiple database servers emerge opportunity.

In a server cluster system, multiple servers are combined to perform the same service, each cluster server provides a service for multiple users respectively and is communicated with one another to realize the data communications among different clusters.

In the communication of the existing instant messaging system through cluster servers, the cluster servers distribute addresses and accounts for instant messaging servers attaching to themselves, so that the instant messaging servers attaching to the different cluster servers can transmit data through the distributed addresses and accounts. In addition, client users attaching to the different cluster servers acquire inter-cluster broadcasting messages from corresponding cluster servers, report the current service states to corresponding cluster servers and acquire the current service states of the client users in other cluster servers from the cluster servers.

However, with the continuous increase of the client users, there are more and more inter-cluster broadcasting messages, much influence is brought to the performance of the instant messaging system, and the amount of the client users which can be borne by the whole system will be greatly limited at the same time, therefore, the data processing ability of the cluster system will be absolutely required to be improved constantly in the current technological development trend.

SUMMARY

Objectives of this disclosure are to provide a cluster server of an instant messaging system and a messaging method between clusters, and to achieve the objectives of effectively using network bandwidths between the clusters, and improving the messaging efficiency and the bearing capacity of the whole instant messaging system by classifying the messages between the clusters.

In order to fulfil the objectives, in one aspect, an embodiment of this disclosure provides a cluster server of an instant messaging system, including:

a storage unit configured to store a piece of first subscription information that a client user of an inner-cluster subscribes the presence state of a client user of an external cluster and a piece of second subscription information that a client user of the external cluster subscribes the presence state of a client user of the inner-cluster;

an information classification unit configured to determine whether the communication message transmitted between a client user of inner-cluster and a client user of the external cluster is a state-presence related message; and an information transmission unit configured to transmit the communication message according to the first and second subscription information when the communication messages is a state-presence related message.

Preferably, in the cluster server, the first subscription information may be specifically a piece of information for recording a corresponding relationship between a first client user of the inner-cluster and a second instant messaging server of the external cluster, wherein the first client user subscribes a presented client user of the external cluster; and the client user of the external cluster logs in the second instant messaging server; and the second subscription information may be specifically a piece of information for recording a corresponding relationship between a first client user and a second cluster server of the external cluster, wherein a client user of the external cluster attaching to the second cluster server subscribes a presence state of the first client user.

Preferably, in the cluster server, the information classification unit may be further configured to transmit a first communication message to the second cluster server according to the second subscription information when determining that a first communication message from the first client user to a client user of the external cluster is a state-presence related message; and the information classification unit may be further configured to transmit a second communication message to a first instant messaging server in which the first client user logs according to the first subscription information when determining that the second communication message from a client user of the external cluster to a client user of the inner-cluster is a state-presence related message and the second instant messaging server acts as a transmitting end for transmitting the second communication message.

Preferably, the cluster server further includes:

an external messaging interface unit configured to provide an interface for messaging with the external cluster; and a client user distribution unit configured to distribute a corresponding instant messaging server for the client user of the inner-cluster;

the information transmission unit is further configured to query a third cluster server to which a destination user for receiving the first communication message attaches through the external messaging interface and transmit the first communication message to the third cluster server when the first communication message is a state-presence unrelated message;

or, the information transmission unit is further configured to acquire a third instant messaging server in which the destination user for receiving the second communication message logs through the user distribution unit and transmitting the second communication message to the third instant messaging server when the second communication message is a state-presence unrelated message.

Preferably, in the cluster server, the information classification unit is further configured to determine whether the first communication message is a non-real-time message before the first communication message is transmitted.

Preferably, in the cluster server, the information transmission unit is further configured to store the first communication message in a corresponding message waiting queue for transmitting when the first communication message is a non-real-time message, and compress the message waiting queue for transmitting into a complex message and transmit the complex message when the message waiting queue for transmitting reaches the preset length.

Preferably, in the cluster server, before the information classification unit determines whether the second communication message is a state-presence related message, the information transmission unit is further configured to parse the second communication message into multiple independent messages when the second communication message is a complex message.

Preferably, in the cluster server, the cluster server is in communication link with a global server through which a corresponding cluster server to which the client users of the external cluster attach is queried.

In another aspect, this disclosure further provides a messaging method between clusters in instant messaging, the method includes that:

acquiring a communication message transmitted between a client user of an inner-cluster and a client user of an external cluster; and when the communication message is a state-presence related message, sending the communication message according to a piece of first pre-stored subscription information that a client user of the inner-cluster subscribes a presence state of a client user of the external cluster or according to a piece of second pre-stored subscription information that a client user of the external cluster subscribes the presence state of a client user of the inner-cluster.

Preferably, in this method, the first subscription information may be specifically a piece of information for recording a corresponding relationship between a first client user of the inner-cluster and a second instant messaging server of the external cluster, wherein the first client user subscribes a presented client user of the external cluster; and the client user of the external cluster logs in the second instant messaging server; and the second subscription information may be specifically a piece of information for recording a corresponding relationship between a first client user and a second cluster server of the external cluster, wherein a client user of the external cluster attaching to the second cluster server subscribes a presence state of the first client user.

In the above-mentioned technical solution, at least one technical feature of the cluster server and the messaging method between clusters has the following advantages:

by storing the first subscription information that a client user of the inner-cluster subscribes the state of a client of the external cluster and the second subscription information that a client of the external cluster subscribes the state of a client user of the inner-cluster, classifying the communication messages transmitted between a client of the inner-cluster and a client of the external cluster, and querying pre-stored related subscription information when the communication message is a state-presence related message, the addresses of all the destination receiving ends of the communication messages can be acquired so as to solve the problem that the cluster server repeatedly processes a large amount of state broadcasting messages to affect the data processing capacity of the system, thereby effectively using the network bandwidths between clusters and improving the messaging efficiency.

The subscription relationship that a client user of the inner-cluster subscribes the state of a client of the external cluster is expanded to the relationship between a client user of the inner-cluster and an instant messaging server in the external cluster, and the relationship that a client of the external cluster subscribes the state of a client user of the inner-cluster is expanded to the relationship between a server of the external cluster and a client user of the inner-cluster by the first and second subscription information, so that it is only necessary to transmit one common message about the state presence between the client user of the inner-cluster and the client user of the external cluster, thereby effectively reducing the total amount and length of the messages transmitted among clusters and avoiding network congestion.

In addition, the messages are further divided into real-time message and non-real-time message; as a non-real-time message, the received message is stored in a message waiting queue for transmitting to be transmitted to the same destination receiving end at first; and the message waiting queue for transmitting is compressed into a set message to be transmitted when the message waiting queue for transmitting reaches the preset length, so that the total amount and total length of the messages transmitted among clusters are effectively reduced, and the effects of effectively using the network bandwidths between clusters and improving the messaging efficiency are achieved

DETAILED DESCRIPTION

To make the objectives and technical solutions and advantages of this disclosure clearer, this disclosure will be described below in detail with reference to the drawings and embodiments.

In a cluster server of the instant messaging system and a system and method for messaging between clusters of this disclosure embodiments, when acquiring the messages from the client users of the inner-cluster to the client users of the external cluster and the messages from the client users of the external cluster to the client users of the inner-cluster, the cluster server divides the received messages into a state-presence related message and a state-presence unrelated message according to message types, then further divides the state-presence related message and the state-presence unrelated message into a real-time message and a non-real-time message according to the characteristics of the messages, and processes different messages in different ways so as to achieve the effects of effectively using the network bandwidths between clusters, improving the messaging efficiency, reducing the total amount and length of the messages transmitted among the clusters and effectively avoiding network congestion.

The state presence related message and the state presence unrelated message and the real-time and non-real-time messages are described at first in order that those skilled in the art can clearly know the system and method in the embodiments of this disclosure. In the instant messaging system, the messages a state-presence related message refer to the messages related to the online presence state of a client user; those skilled in the art can see that the current states of users on instant messaging software, such as QQ and MSN, will always change, so it is necessary to frequently respond the information related to the state of a client user to a friend user subscribing the state of the client user; and it is easy to understand that the state-presence unrelated message refer to the messages not related to the current state of the client user. Real-time messages refer to those needing to be transmitted in real time and the non-real-time messages refer to those not needing to be transmitted in real time.

Figure 1:
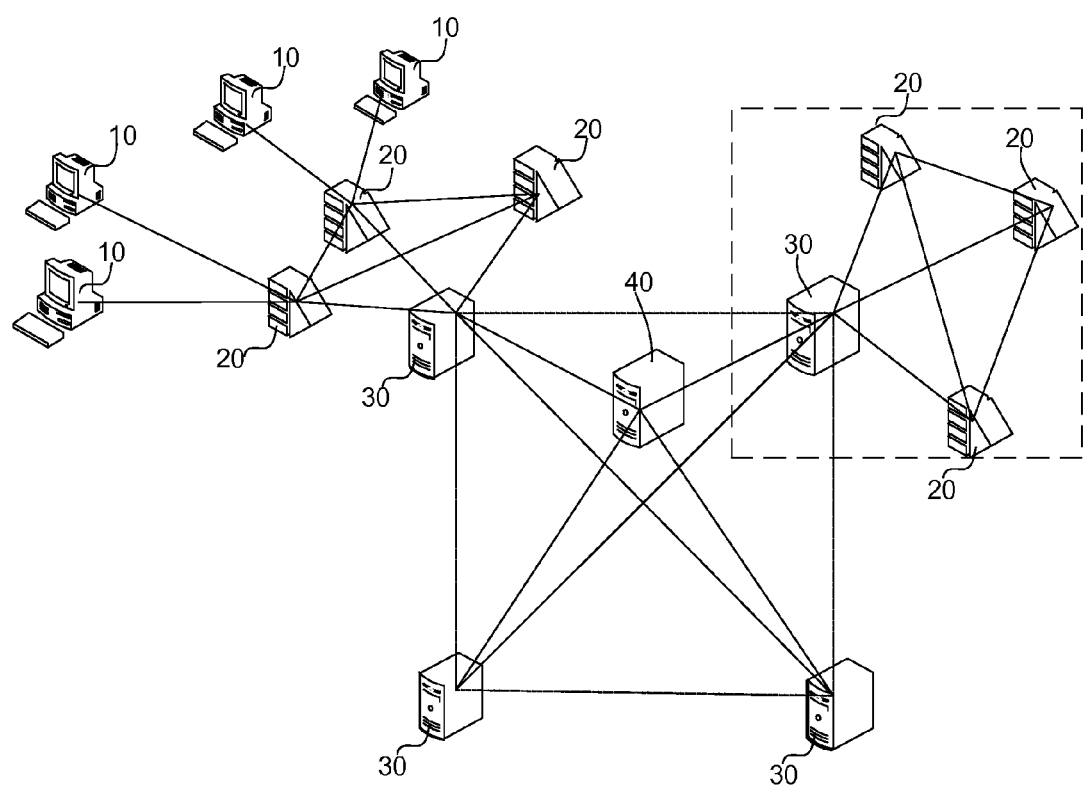
FIG. 1 shows a connection diagram of the structure of an instant messaging system adopting the cluster server of an embodiment of this disclosure.

FIG. 1 shows a connection diagram of the structure of an instant messaging system adopting the cluster server of an embodiment of this disclosure; as shown in FIG. 1, the instant messaging system includes:

multiple instant messaging terminals 10 configured to implement the logging of at least one client user in an instant messaging system;

multiple instant messaging servers 20 in one of which at least one instant messaging terminal logs for providing an instant messaging service for a client user;

multiple cluster servers 30 each including at least two instant messaging servers 20, wherein the instant messaging servers 20 in the same cluster log in the same cluster server 30 which is configured to distribute client users to the instant messaging servers 20 attaching thereto and providing interfaces messaging with other clusters; and a global server 40 configured to store the corresponding relationship between a client user and the cluster server 30 to which the client user attaches, wherein each cluster server 30 is linked with the global server 40 through which the address of the corresponding cluster server 30 of each client user is acquired.

In the process of instant messaging, the messaging system between clusters forms a cluster system with multiple Database Servers (DBs) and taking the global server 40 as the centre; and the global server 40 numbers each cluster server of the instant messaging system to ensure the uniqueness of each cluster server of the instant messaging system, and also numbers each instant messaging server in the cluster to ensure the uniqueness of each instant messaging server in the cluster.

Figure 2:
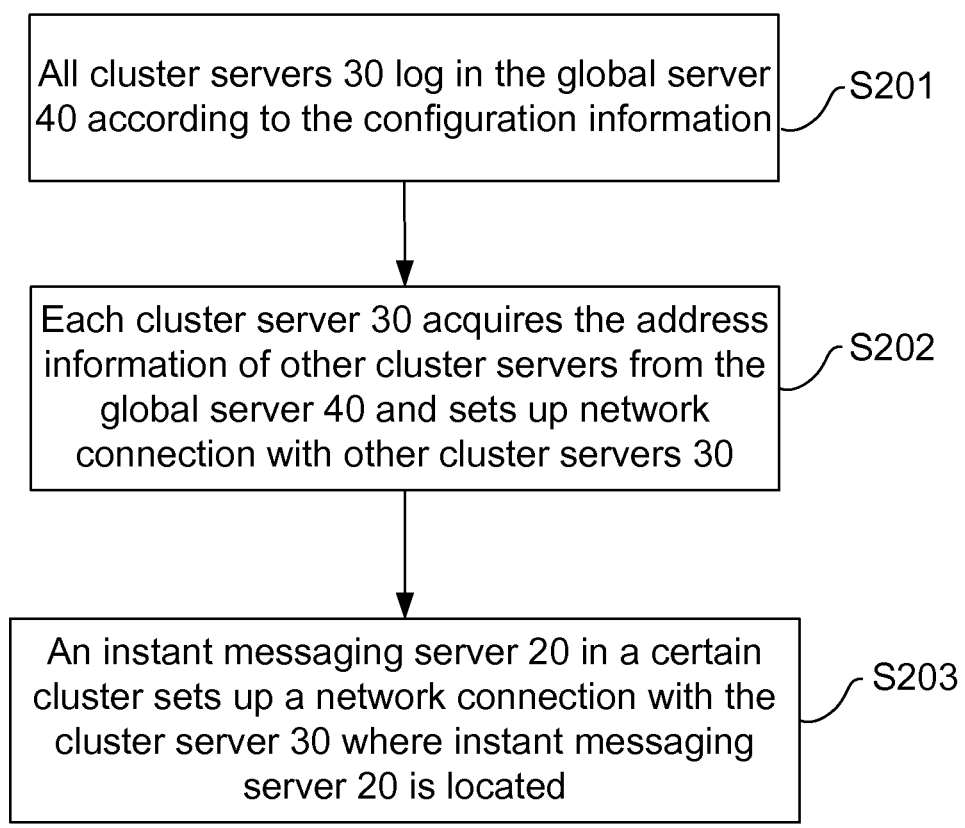
FIG. 2 shows a diagram of the process of configuring the instant messaging system in FIG. 1.

As shown in FIG. 2, the configuration process of forming the cluster system with multiple DBs and taking the global server 40 as the centre through the instant messaging system includes:

S201: all cluster servers 30 log in the global server 40 according to the configuration information;

S202: each cluster server 30 acquires the address information of other cluster servers from the global server 40 and sets up network connection with other cluster servers 30; and S203: an instant messaging server 20 in a certain cluster sets up network connection with the cluster server 30 where it is located.

Figure 3:
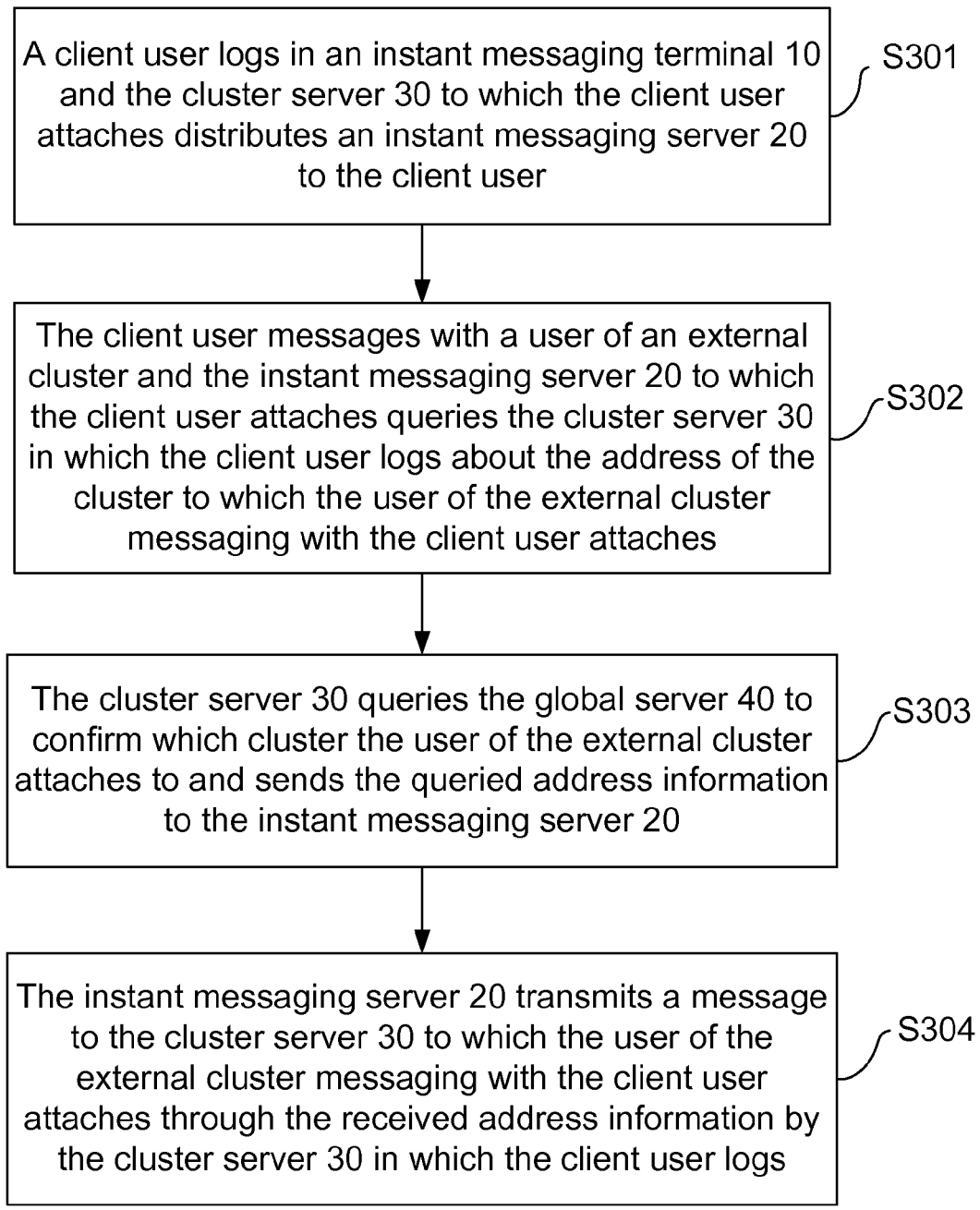
FIG. 3 shows a diagram of the process of messaging between clusters through the instant messaging system in FIG. 1.

Through the configuration, the multi-DBs cluster system including the instant messaging servers 20, the cluster servers 30 and the global server 40 is configured; and the messaging process between clusters through the instant messaging system is as shown in FIG. 3, the messaging process includes that:

S301: a client user logs in an instant messaging terminal 10 and the cluster server 30 to which the client user attaches distributes an instant messaging server 20 to it;

S302: the client user messages with a client user of an external cluster; and the instant messaging server 20 to which the client user attaches queries the cluster server 30 in which the client user logs about the address of the cluster to which the user of the external cluster messaging with the client user attaches;

S303: the cluster server 30 queries the global server 40 to confirm to which cluster the user of the external cluster attaches and sends the queried address information to the instant messaging server 20; and S304: the instant messaging server 20 transmits a message to the cluster server 30 to which the user of the external cluster messaging with the client user attaches through the received address information by the cluster server 30 in which the client user logs.

Through the processes, the steps of transmitting information from the user of the external cluster to the client user can be obtained by analogy, thereby needing no further description. Thus, through the messaging processes, the inter-cluster mutual messaging in the instant messaging system can be realized.

In the embodiments of this disclosure, in order to provide the messaging efficiency and bearing capacity of the instant messaging system, the instant messaging server 20 in the system divides the message into the state-presence related message or the state-presence unrelated message, then further divides them into the real-time messages or non-real-time messages according to the characteristics of the messages when transmitting messages to a client of the external cluster through the cluster server 30 to which it attaches or receiving the messages from a client of the external cluster to a client user of the inner-cluster; and processes different messages in different ways.

With the cluster server corresponding to a client user of an inner-cluster as a first cluster server and the cluster server corresponding to a client user of the external cluster as a second cluster server as an example, the structure of the cluster server of an embodiment of this disclosure is described below in detail, but those skilled in the art can see that, the amount of the cluster servers of the system is not limited to two and is only for the clear description here with reference to FIG. 1.

Figure 4:
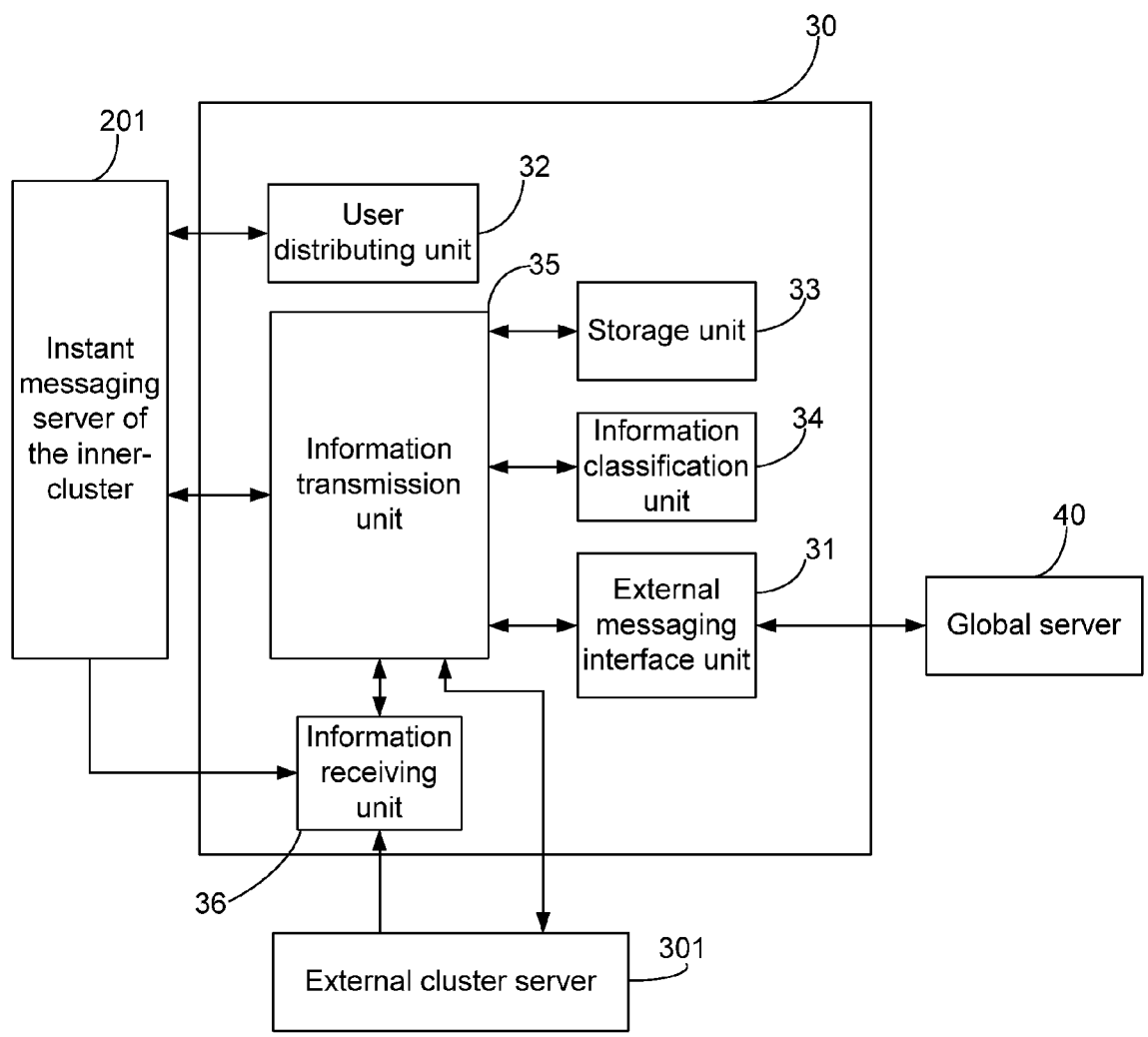
FIG. 4 shows a diagram of the structure of the cluster server of an embodiment of this disclosure.

FIG. 4 shows a diagram of the structure of the cluster server 30 of an embodiment of this disclosure, here, the cluster server is the first cluster server, with reference to FIG. 4, the cluster server 30 includes:

an external messaging interface unit 31 configured to provide an interface for messaging with the external cluster;

a client user distribution unit 32 configured to distribute a client user for an instant messaging server of an inner-cluster and record a corresponding relationship between the client user and the instant messaging server to which the client user attaches;

a storage unit 33 configured to store the first subscription information that a client user of the inner-cluster subscribes the presence state of a client of an external cluster and the second subscription information that a client of the external cluster subscribes the presence state the client user; specifically, the first subscription information being configured to record the corresponding relationship between a first client user of the inner-cluster and a second instant messaging server of the external cluster, wherein the second instant messaging server is an instant messaging server in which the second client user logs when the first client user subscribes the state information of the second client user in the external cluster the second subscription information being configured to record the corresponding relationship between the first client user and the second cluster server of the external cluster, wherein the second cluster server is a cluster server subscribing the state information of the first client user;

an information receiving unit 36 configured to receive the messages transmitted between a client user of the inner-cluster and a client user of the external cluster;

an information classification unit 34 configured to determine whether the message transmitted between the client user of the inner-cluster and the client user of the external cluster is a state-presence related message or not; and an information transmission unit 35 configured to transmit the messages according to the first or second subscription information when the message transmitted between the client user of the inner-cluster and the client user of the external cluster is a state-presence related message.

The communication server 30 with the abovementioned structure can acquire the addresses of all the destination receiving ends of the communication messages by storing the first and second subscription information, classifying the communication messages between the client user of the inner-cluster and the client user of the external cluster and querying the pre-stored related subscription information when the communication messages are a state-presence related message, thereby solving the problem that the cluster server repeatedly processes a large amount of state broadcasting messages to affect the system data processing capacity, effectively using the network bandwidths between clusters and improving the messaging efficiency.

Specifically, the information transmission unit 35 transmits the communication messages in the following ways: when the first communication message transmitted by the first client user of the inner-cluster through the first instant messaging server in which it logs is a state-presence related message, it queries the second subscription information and transmits the first communication message to the second cluster server; and when the first communication message is a state-presence unrelated message, it queries the third cluster server to which the destination user for receiving the first communication message attaches through the external messaging interface unit 31 and transmits the first communication message to the third cluster server, wherein the first instant messaging server is the instant messaging server 201 of the inner-cluster shown in FIG. 4; and the second cluster server is the server of the external cluster 301 shown in FIG. 4.

When the second communication message from the external cluster to the inner-cluster is received and the transmitting server of the second communication message is determined to be the second instant messaging server, the first subscription information is queried and the second communication message is transmitted to the first instant messaging server; and when the second communication message is a state-presence unrelated message, the third instant messaging server to which the destination user for receiving the second communication message attaches is acquired through the user distribution unit and the second communication message is transmitted to the third instant messaging server.

In the cluster server 30, by storing the first and second subscription information, expanding the subscription relationship that the client user of the inner-cluster subscribes the state of the client of the external cluster to the relationship between the client user of the inner-cluster and the instant messaging server in the external cluster, and the relationship that the client of the external cluster subscribes the state of the client user of the inner-cluster to the relationship between the server of the external cluster and the client user of the inner-cluster, it is only necessary to transmit a common message to a corresponding cluster server to which the client of the external cluster attaches by the cluster server of the inner-cluster no matter how many clients of the external cluster subscribe the state of the client user of the inner-cluster when the state of the client user in the inner-cluster is changed; and it is also only necessary to transmit a common message to a corresponding instant messaging server by the cluster server of the cluster no matter how many client users of the inner-cluster subscribe the state information of the client of the external cluster when the state of the client of the external cluster is changed, thereby achieving the effects of effectively using the network bandwidths between clusters, improving the messaging efficiency, reducing the total amount and length of the messages transmitted among the clusters and effectively avoiding network congestion.

In addition, the information classification unit 34 of the cluster server 30 of an embodiment of this disclosure divides the messages transmitted among clusters into a state-presence related message and a state-presence unrelated message, and then further divides them into real-time messages and non-real-time messages; the real-time messages are transmitted to corresponding receiving ends after being received by the method; the non-real-time messages are stored to a message waiting queue for transmitting to be transmitted to the same destination receiving end at first; and when having the preset length, the message waiting queue for transmitting is compressed into a set message to be sent; so that the total amount and length of the messages transmitted among the clusters are effectively reduced, and the effects of effectively using the network bandwidths between clusters and improving the communication effect are achieved.

Based on what abovementioned, the second communication message received from the external cluster to the information receiving unit 36 in the cluster server 30 shown in FIG. 4 may be a complex message, so the information receiving unit 36 is further configured to determine whether the second communication message is a complex message; and the information transmission unit 35 is further configured to parse the second communication message into multiple independent communication messages when the second communication message is a complex message and then classify each independent communication message.

Figure 5:
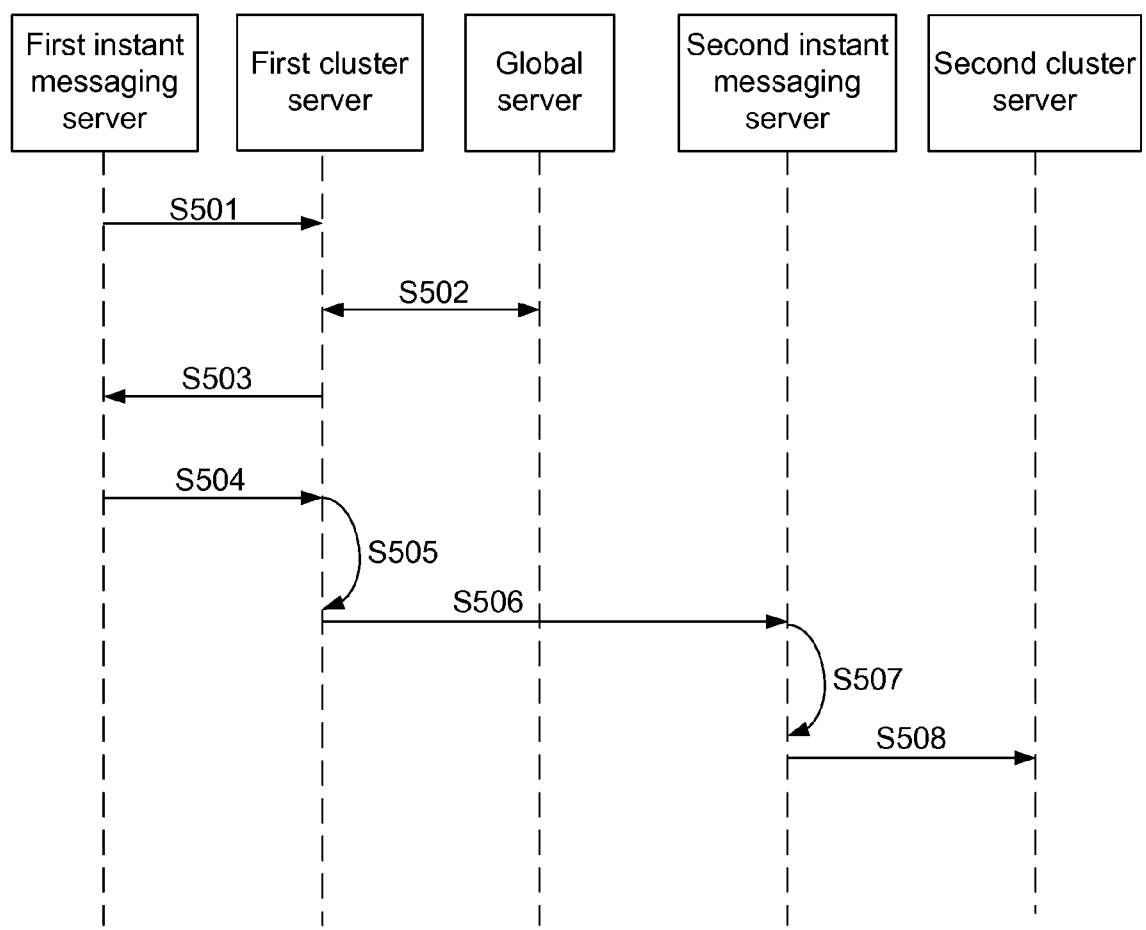
FIG. 5 shows a diagram of the flow of transmitting messages which is a state-presence unrelated message by the instant messaging system adopting the cluster server of an embodiment of this disclosure.
Figure 6:
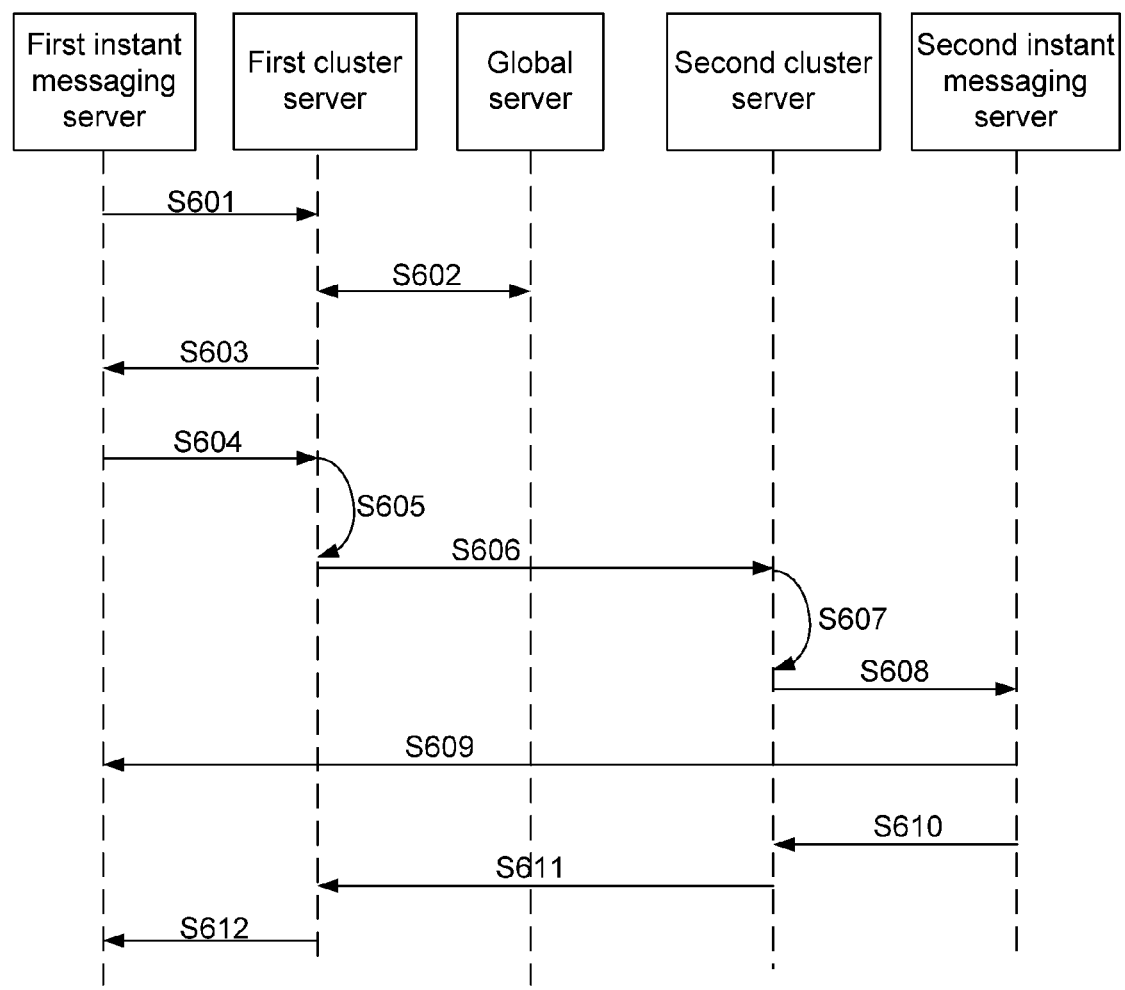
FIG. 6 shows a diagram of the flow of transmitting messages a state-presence related message by the instant messaging system adopting the cluster server of an embodiment of this disclosure.

The process of processing messages by the instant messaging system adopting the cluster server of an embodiment of this disclosure by the message classification method will be described below in detail. FIG. 5 shows a diagram of the flow of transmitting the state-presence unrelated message by the instant messaging system adopting the cluster server of an embodiment of this disclosure; and FIG. 6 shows a diagram of the flow of transmitting the messages a state-presence related message by the instant messaging system adopting the cluster server of an embodiment of this disclosure.

With reference to FIG. 5, in order to be better understood, the inner-cluster is called the first cluster; users in the inner-cluster are called the first client users; the instant messaging server and cluster server to which the first client users attach are called the first instant messaging server and the first cluster server; also, the external cluster is called the second cluster; the users in the external cluster are called the second client users; and the instant messaging server and cluster server to which the second client users attach are called the second instant messaging server and the second cluster server. As shown in FIG. 5, when the message transmitted by a first client user is a state-presence unrelated message, the process of processing the messages by the system includes:

S501: the first instant messaging server queries about the address of the second cluster server to which the second client user attaches and a message is transmitted through the first cluster server;

S502: the first cluster server queries the global server about the address of the second cluster server and saves the query result in local cache so as to effectively improve the information processing efficiency and reduce the load of the global server;

S503: the first cluster server sends the query result to the first instant messaging server;

S504: the first instant messaging server transmits the messages to be transmitted to the first cluster server;

S505: the first cluster server determines whether the messages to be transmitted are the real-time ones or the non-real-time ones, if they are the non-real-time ones, the messages are placed in the message waiting queue for transmitting to be transmitted to the second cluster server; when the message waiting queue for transmitting reaches the preset length or is time out, all the messages in the message waiting queue for transmitting are compressed into a complex message;

S506: the first cluster server transmits the real-time messages or the compressed complex message to the second cluster server;

S507: the second cluster server receives the messages from the first cluster server, when the messages are the compressed complex message, the complex message is parsed and each message in the complex message is parsed one by one; and S508: when the second cluster server determines that the address of the second instant messaging server to which the destination receiving end attaches has been directly indicated in the received messages, the messages are directly transmitted to the second instant messaging server; and when the second cluster server determines that the address of the second instant messaging server to which the destination receiving end attaches is not directly indicated in the received messages, the address of the second instant messaging server is searched according to the pre-stored corresponding relationship between the second client user and the second instant messaging server, and then the messages are transmitted out.

By the steps S501 to S508, a client user in a cluster of the instant messaging system can transmit a state-presence unrelated message to a client of the external cluster, wherein when the message to be transmitted is a non-real-time message, complex messages transmitted to the same cluster server are combined into a complex message to be transmitted in a delay transmitting way, so that the total amount and length of the messages transmitted among the clusters are effectively reduced and the effects of effectively using the network bandwidths between clusters and improving the messaging efficiency are achieved.

FIG. 6 shows a diagram of the process of processing messages which are transmitted by the second client user and a state-presence related message by the instant messaging system, the process including:

S601: the first instant messaging server queries about the address of the second cluster server to which the second client user attaches and a message is transmitted through the first cluster server;

S602: the first cluster server queries the global server about the address of the second cluster server and buffers and saves the query result in local;

S603: the first cluster server sends the query result to the first instant messaging server;

S604: the first cluster messaging server transmits the subscription request message of the second client user to the first cluster server and indicates that the subscription request information is a state-presence related message and also the address of the second cluster server receiving the subscription request message;

S605: the first cluster server stores the first subscription information that the client user subscribes the state of the second client user according to the subscription request message, wherein the first subscription information includes the information of the first client user and the address of the second instant messaging server to which the second client user subscribed by the first client user attaches, so that the granularity of the subscription relationship is only detailed to a corresponding instant messaging server rather than a single client user of the external cluster, thereby reducing the amount of the data stored in the cluster server and favouring for the data recovery after the partial breakdown of the system;

S606: the first cluster server forwards the subscription request to the second cluster server;

S607: the second cluster server stores the second subscription information that the first client user subscribes the state of the second client user according to the subscription request, wherein the second subscription information includes the information of the second client user and the address of the first cluster server to which the first client user subscribing the state information of the second client user attaches, so that the granularity of the subscription relationship is detailed to the cluster server rather than a specific client user;

S608: the second cluster server forwards the subscription request of the second client user to the second instant messaging server in which the destination user logs or distributes an idle instant messaging server to the second client user;

S609, the second client user responds the subscription request information, forwards the response message to the first instant messaging server in which a subscription request part (the first client user) logs through the second instant messaging server;

S610: when the state of the second client user is changed, the common message about the state change is transmitted to the second cluster server through the second instant messaging server;

S611: the second cluster server forwards the common message about the state change to the first cluster server subscribing the state of the client user according to the second subscription information; and S612: the first cluster server forwards the received common message about the state change of the second client user to the first instant messaging server to which the first client user attaches according to the first subscription information.

In addition, in steps S606 to S612, when the subscription request message or the state change message forwarded between the first and the second cluster servers is a non-real-time message, complex messages transmitted to the same cluster server are combined into a complex message to be transmitted in the delay transmitting way.

By the steps S601 to S608 and steps 601 to 612, the cluster server of the instant messaging system divides the processed messages into a state-presence related message or a state-presence unrelated message according to the types and further divides them into real-time ones and non-real-time ones according to the characteristics of the messages; through the classification, different messages are transmitted in different ways; so that the total amount of the short messages transmitted in the system is reduced and the effects of effectively using the network bandwidths between clusters, improving the messaging efficiency and avoiding network congestion are achieved.

In another aspect, an embodiment of this disclosure further provides a messaging method between clusters in the instant messaging, which is used in the instant messaging system including the instant messaging terminal, instant messaging server and cluster server and includes:

acquiring communication messages transmitted between a client user of the inner-cluster and a client user of the external cluster; and sending the communication messages according to the first pre-stored subscription information that the client user of the inner-cluster subscribes the presence state of the client user of the external cluster or the second pre-stored subscription information that the client user of the external cluster subscribes the presence state of the client user of the inner-cluster when the communication message is a state-presence related message.

Figure 7:
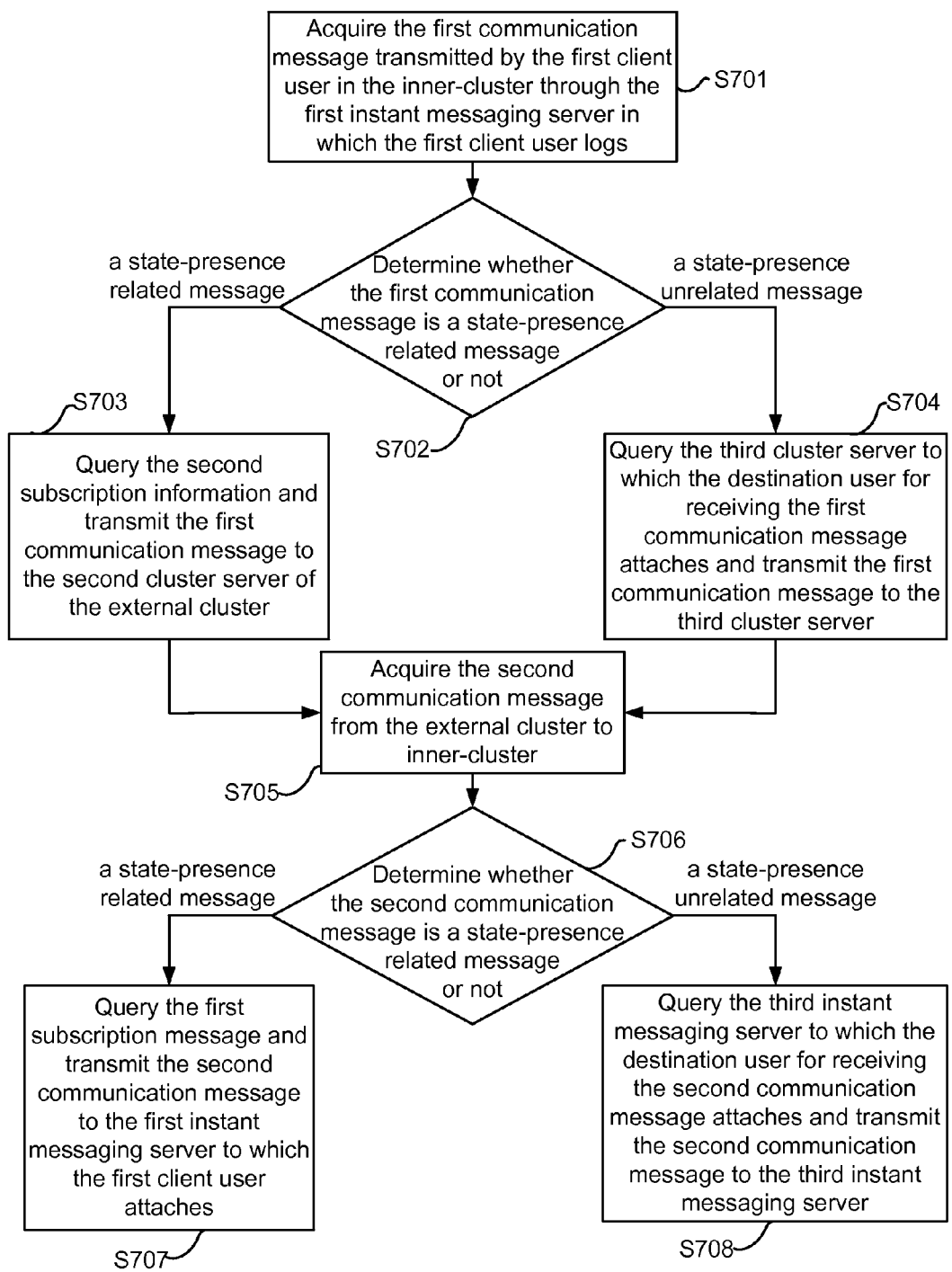
FIG. 7 shows a diagram of the flow of a method embodiment of this disclosure.

FIG. 7 shows a diagram of the flow of a method of an embodiment of this disclosure, including:

S701: the first cluster server of the cluster server acquires the first communication message transmitted by the first client user in inner-cluster through the first instant messaging server in which it logs;

S702: the first cluster server determines whether the first communication message is a state-presence related message or not, if it is a state-presence related message, S703 is executed; and if it is a state-presence unrelated message, S704 is executed;

S703: the first cluster server queries the second pre-stored subscription information that the client of the external cluster subscribes the state of the client user and transmits the first communication message to the second cluster server of the external cluster, wherein the second subscription information records the corresponding relationship between the first client user and the second cluster server and the second cluster server is the cluster server subscribing the state information of the first client user;

S704: the first cluster server queries the third cluster server to which the destination user for receiving the first communication message attaches through the external messaging interface unit and transmits the first communication message to the third cluster server;

S705: the first cluster server acquires the second communication message transmitted from the external cluster to inner-cluster;

S706: the first cluster server determines whether the second communication message is a state-presence related message or not, if it is a state-presence related message, S707 is executed; and if it is a state-presence unrelated message, S708 is executed;

S707: the first cluster server queries the first pre-stored subscription information that the client user subscribes the state of the client of the external cluster and transmits the second communication message to the first instant messaging server to which the first client user attaches according to the first subscription information, wherein the first subscription information is configured to record the corresponding relationship between the first client user in the inner-cluster and the second instant messaging server of the external cluster; wherein the second instant messaging server is an instant messaging server in which the second client user logs when the first client user subscribes the state information of the second client user in the external cluster; and S708: the first cluster server queries the third instant messaging server to which the destination user for receiving the second communication message attaches through the pre-stored user distribution information and transmits the second communication message to the third instant messaging server.

In steps S701 to S708, the subscription relationship that the client user of the inner-cluster subscribes the state of the client of the external cluster is expanded to the relationship between the client user of the inner-cluster and the instant messaging server of the external cluster by the first subscription information; and the relationship that the client of the external cluster subscribes the state of the client user of the inner-cluster is expanded to the relationship between the server of the external cluster and the client user of the cluster by the second subscription information, so that the network bandwidths between clusters are fully used and the aim of improving the messaging efficiency is fulfilled.

In addition, in an embodiment of this disclosure, before the first cluster server transmits the first communication message to the second cluster server, it is necessary to determine whether the first communication message is the non-real-time message; when it is a non-real-time message, the first communication message is stored in the message waiting queue for transmitting to be transmitted to the same destination receiving cluster server at first; and when having the preset length, the message waiting queue for transmitting is compressed into a complex message to be sent, so that the total amount and length of the messages transmitted among the clusters in the instant messaging system are reduced and the effects of improving the messaging efficiency and effectively avoiding network congestion are achieved.

Therefore, to sum up, in the cluster server and the messaging method between clusters of the embodiments of this disclosure, by classifying the messages between clusters, the objectives of effectively using the network bandwidths between clusters, and improving the messaging efficiency and the bearing capacity of the whole instant messaging system can be fulfilled.

Here, the instant messaging abovementioned is represented by IM for short; the database server is represented by DB for short; the state presence is represented by present service; and the non-state-presence is represented by non-present service.

What mentioned above are the preferential embodiments of this disclosure, it should be indicated that various improvement or modification shall be made by those skilled in the art within the concept of this disclosure and fall within the protection scope of this disclosure.

What is claimed is:

1. A cluster server, which is part of an instant messaging system for messaging between clusters, wherein the instant messaging system further comprises an instant messaging server and a client user, the cluster server comprises:

a storage unit configured to store a piece of first subscription information that a client user of an inner-cluster subscribes a presence state of a client user of an external cluster and a piece of second subscription information that a client user of the external cluster subscribes a presence state of a client user of the inner-cluster;

an information classification unit configured to determine whether a communication message transmitted between a client user of the inner-cluster and a client user of the external cluster is a presence state related message; and an information transmission unit configured to transmit a communication message according to the first and second subscription information when the communication message is a presence state related message; and wherein the first subscription information is specifically a piece of information for recording a corresponding relationship between a first client user of the inner-cluster and a second instant messaging server of the external cluster; wherein the first client user subscribes a presented client user of the external cluster; the client user of the external cluster logs in the second instant messaging server; and the second subscription information is specifically a piece of information for recording a corresponding relationship between the first client user of the inner-cluster and a second cluster server of the external cluster; wherein a client user of the external cluster attaching to the second cluster server subscribes a presence state of the first client user;

the information classification unit is further configured to transmit a first communication message to the second cluster server according to the second subscription information when determining that a first communication message from the first client user to the client user of the external cluster is a presence state related message;

or, the information classification unit is further configured to transmit a second communication message to a first instant messaging server in which the first client user logs according to the first subscription information when determining that the second communication message from the client user of the external cluster to the client user of the inner-cluster is a presence state related message and the second instant messaging server acts as a transmitting end for transmitting the second communication message.

2. The cluster server according to claim 1, further comprising:

an external messaging interface unit configured to provide an interface for messaging with the external cluster; and a client user distribution unit configured to distribute a corresponding instant messaging server for the client user of the inner-cluster;

the information transmission unit is further configured to query a third cluster server to which a destination user for receiving the first communication message attaches through the external messaging interface unit and transmit the first communication message to the third cluster server when the first communication message is a presence state unrelated message;

or, the information transmission unit is further configured to acquire a third instant messaging server in which the destination user for receiving the second communication message logs through the user distribution unit and transmit the second communication message to the third instant messaging server when the second communication message is a presence state unrelated message.

3. The cluster server according to claim 1, wherein the information classification unit is further configured to determine whether the first communication message is a non-real-time message before the first communication message is transmitted.

4. The cluster server according to claim 3, wherein the information transmission unit is further configured to store the first communication message in a corresponding message waiting queue for transmitting when the first communication message is a non-real-time message, and compress the message waiting queue for transmitting into a complex message and transmit the complex message when the message waiting queue for transmitting reaches a preset length.

5. The cluster server according to claim 4, wherein the information transmission unit is further configured to parse the second communication message into multiple independent messages when the second communication message is a complex message and before the information classification unit determines whether the second communication message is a presence state related message.

6. The cluster server according to claim 1, wherein the cluster server is in communication link with a global server through which a corresponding cluster server to which the client user of the external cluster attaches is queried.

7. A messaging method between clusters in instant messaging, comprising:

acquiring a communication message transmitted between a client user of an inner-cluster and a client user of an external cluster;

when the communication message is a presence state related message, sending the communication message according to a piece of first pre-stored subscription information that the client user of the inner-cluster subscribes a presence state of the client user of the external cluster or according to a piece of second pre-stored subscription information that the client user of the external cluster subscribes a presence state of the client user of the inner-cluster;

wherein the first subscription information is specifically a piece of information for recording a corresponding relationship between a first client user of the inner-cluster and a second instant messaging server of the external cluster; wherein the first client user subscribes a presented client user of the external cluster; the client user of the external cluster logs in the second instant messaging server; and the second subscription information is specifically a piece of information for recording a corresponding relationship between the first client user of the inner-cluster and a second cluster server of the external cluster; wherein a client user of the external cluster attaching to the second cluster server subscribes a presence state of the first client user;

when determining that a first communication message from the first client user to the client user of the external cluster is a presence state related message, transmitting a first communication message to the second cluster server according to the second subscription information;

or, when determining that the second communication message from the client user of the external cluster to the client user of the inner-cluster is a presence state related message and the second instant messaging server acts as a transmitting end for transmitting the second communication message, transmitting a second communication message to a first instant messaging server in which the first client user logs according to the first subscription information.

8. The cluster server according to claim 2, wherein the information classification unit is further configured to determine whether the first communication message is a non-real-time message before the first communication message is transmitted.

9. The cluster server according to claim 8, wherein the information transmission unit is further configured to store the first communication message in a corresponding message waiting queue for transmitting when the first communication message is a non-real-time message, and compress the message waiting queue for transmitting into a complex message and transmit the complex message when the message waiting queue for transmitting reaches a preset length.

10. The cluster server according to claim 9, wherein the information transmission unit is further configured to parse the second communication message into multiple independent messages when the second communication message is a complex message and before the information classification unit determines whether the second communication message is a presence state related message.

* * * * *